United States Patent
Ito et al.

(10) Patent No.: US 9,016,309 B2
(45) Date of Patent: Apr. 28, 2015

(54) PROTECTIVE COVER FOR CANISTER VENT SOLENOID VALVE

(75) Inventors: Takayuki Ito, Tokyo (JP); Satoshi Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 12/997,775

(22) PCT Filed: Jul. 9, 2009

(86) PCT No.: PCT/JP2009/003202
§ 371 (c)(1),
(2), (4) Date: Dec. 13, 2010

(87) PCT Pub. No.: WO2010/023806
PCT Pub. Date: Mar. 4, 2010

(65) Prior Publication Data
US 2011/0162726 A1    Jul. 7, 2011

(30) Foreign Application Priority Data
Sep. 1, 2008 (JP) ................................ 2008-223205

(51) Int. Cl.
*F16K 31/06* (2006.01)
*F02M 25/08* (2006.01)
*B60K 15/035* (2006.01)

(52) U.S. Cl.
CPC ...... *F02M 25/0836* (2013.01); *B60K 15/03519* (2013.01); *F02M 25/0854* (2013.01)

(58) Field of Classification Search
CPC .......... F16K 27/029; B60K 15/03519; H01H 50/02; H01H 50/041; H01H 50/048
USPC .......... 251/129.15; 137/351, 377, 382, 382.5, 137/899, 884; 335/202, 278
See application file for complete search history.

(56) References Cited

U.S. PATENT DOCUMENTS 3,571,771 A * 3/1971 Stephanson .................... 335/278
4,542,359 A * 9/1985 Ide et al. .......................... 335/78
(Continued)

FOREIGN PATENT DOCUMENTS

| JP | 9-68028 A | 3/1997 |
|----|-----------|--------|
| JP | 10-176613 A | 6/1998 |

(Continued)

OTHER PUBLICATIONS

Translation of Yamanaka, "Electromagnetic Valve", May 20, 1983, Japanese Patent Office.*

*Primary Examiner* — John K Fristoe, Jr.
*Assistant Examiner* — Seth W MacKay-Smith
(74) *Attorney, Agent, or Firm* — Birch, Stewart, Kolasch & Birch, LLP

(57) ABSTRACT

A protective cover 10 is mounted to the outer surface of a yoke 2 of a canister vent solenoid valve 1 installed near a rear wheel of a vehicle body. A guide groove engaged with fringes of a yoke mounting board 3 is provided in the inner walls of opposite side plates 10*b* of the cover 10. On the sides of the plates 10*b* opposite a top plate 10*a* are provided mounting sections 12 projecting in a direction parallel to the guide groove. At the tips of the sections 12, there are provided claw sections 12*a* locking edges on the rear of the yoke 2 when the cover 10 is mounted along the groove 11 from the front of the yoke 2. The top plate 10*a* of the cover 10 is provided with a connector hole 13 passing through a power source connector 5 of the valve 1.

7 Claims, 5 Drawing Sheets

(56) References Cited

U.S. PATENT DOCUMENTS

| | | | |
|---|---|---|---|
| 4,567,910 A * | 2/1986 | Slavin et al. | 137/82 |
| 4,742,988 A * | 5/1988 | Haneda et al. | 251/129.01 |
| 5,127,440 A * | 7/1992 | Maas et al. | 137/884 |
| 5,638,854 A * | 6/1997 | Kelly et al. | 137/15.19 |
| 5,823,507 A * | 10/1998 | Inden et al. | 251/129.15 |
| 5,834,998 A * | 11/1998 | Reiss et al. | 335/78 |
| 5,911,401 A * | 6/1999 | Hrytzak et al. | 251/129.15 |
| 6,023,212 A * | 2/2000 | Mader | 335/202 |
| 6,144,270 A * | 11/2000 | Mader et al. | 335/78 |
| 6,293,634 B1 * | 9/2001 | Hosoya | 303/119.2 |
| 2003/0089345 A1 | 5/2003 | Itou et al. | |

FOREIGN PATENT DOCUMENTS

| | | |
|---|---|---|
| JP | 2003-74729 A | 3/2003 |
| JP | 2007-120713 A | 5/2007 |
| WO | WO 02/092989 A1 | 11/2002 |
| WO | WO 2008/020503 A1 | 2/2008 |

* cited by examiner (a)

(b)

(c)

(a)

(b)

PROTECTIVE COVER FOR CANISTER VENT SOLENOID VALVE

TECHNICAL FIELD

The present invention relates to a protective cover for a canister vent solenoid valve.

BACKGROUND ART

A canister vent solenoid valve interposed in an exhaust pipe from a canister is typically installed near a rear wheel of a vehicle body for convenience of layout of a vehicle. The canister vent solenoid valve located at such a position may be damaged in a plating of the surface of a yoke thereof, which is externally exposed, when a stone or the like swirled by a wheel collides against the yoke. Even if the damage of the plating is slight, corrosion of the damaged portion in the plating may be promoted by harsh surroundings, thus impairing functionality as a component thereof. Therefore, conventionally, a method of increasing a plating thickness is often employed as a corrosion-solving method for plated components attached to a vehicle body.

Such canister vent solenoid valves include one disclosed in Patent Document 1; however, the document does not specifically disclose the protection of the plating of the surface of a yoke.

PRIOR ART DOCUMENTS

Patent Documents

Patent Document 1: JP-A-9-68028 (JP-A-1997-68028)

SUMMARY OF THE INVENTION

Since the conventional canister vent solenoid valve is arranged as discussed above, the solenoid valve cannot be prevented from being damaged by external factors including the collision of a stone or the like swirled by wheels thereagainst. Therefore, there is a problem such that the canister vent solenoid valve is damaged in the plating on the surface of the yoke thereof by the external factor, which leads to the occurrence of corrosion therein.

The present invention has been made to solve the above-mentioned problems, and an object of the present invention is to provide a protective cover for preventing the damage of plating on the surface of a yoke which originates from the collision of a stone or the like swirled by wheels therewith, and preventing the corrosion of the yoke due to the plating damage, and also for preventing the yoke itself.

According to the protective cover of the present invention, there is provided with a guide groove to be engaged with the fringe of a yoke mounting board, to which the yoke is mounted, in the inner walls of opposite side plates for covering the outer surface of the yoke of the canister vent solenoid valve.

According to the present invention, since the protective cover has provided in the inner walls of opposite side plates thereof, the guide grooves to be engaged with the fringes of the yoke mounting board, the mounting work is facilitated.

BRIEF DESCRIPTION OF THE DRAWINGS

FIG. 1(*a*) is a plan view, FIG. 1(*b*) is a front view, and FIG. 1(*c*) is a side view.

FIG. 6(*a*) is a plan view, and FIG. 6(*b*) is a front view.

BEST MODE FOR CARRYING OUT THE INVENTION

Embodiments of the present invention will now be described with reference to the accompanying drawings in order to explain the present invention in more detail.

First Embodiment

Figure 1:
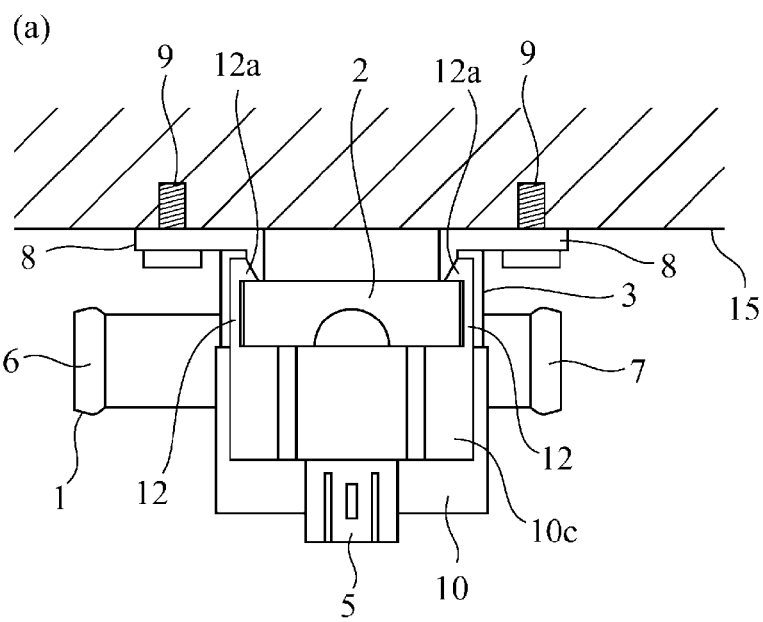
FIG. 1 shows a state where a protective cover is mounted to a canister vent solenoid valve in accordance with a first embodiment of the present invention.
Figure 1:
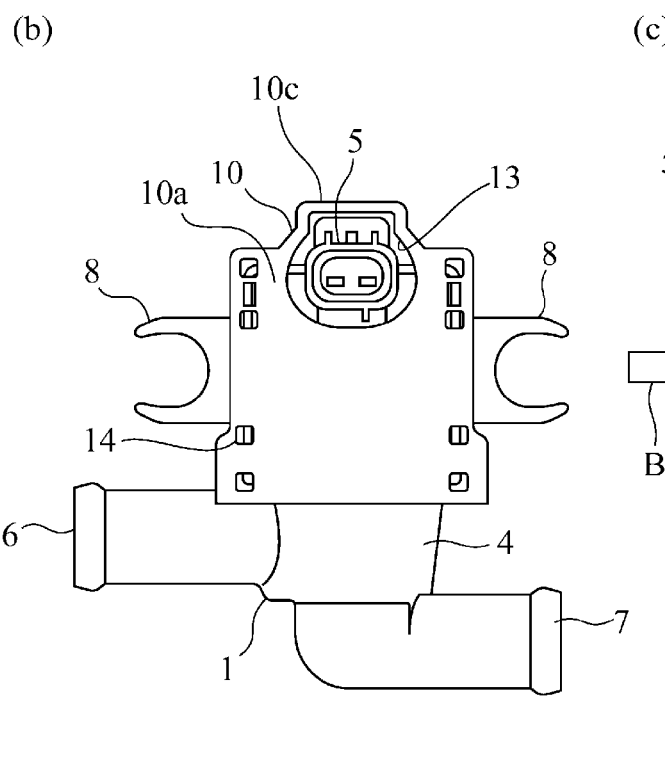
Figure 1:
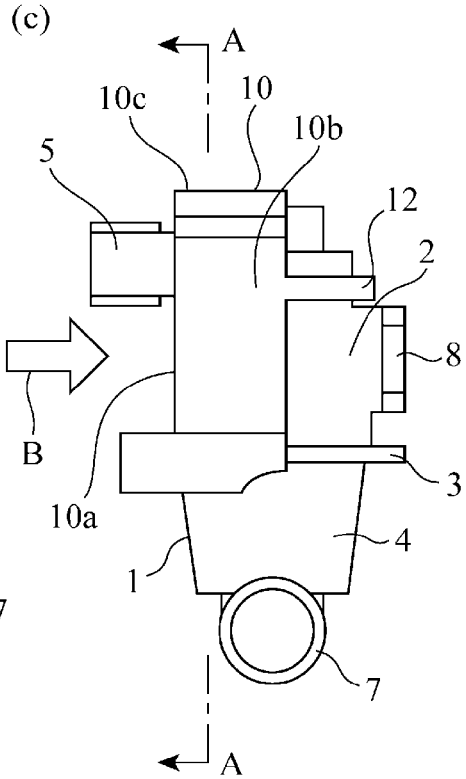
Figure 2:
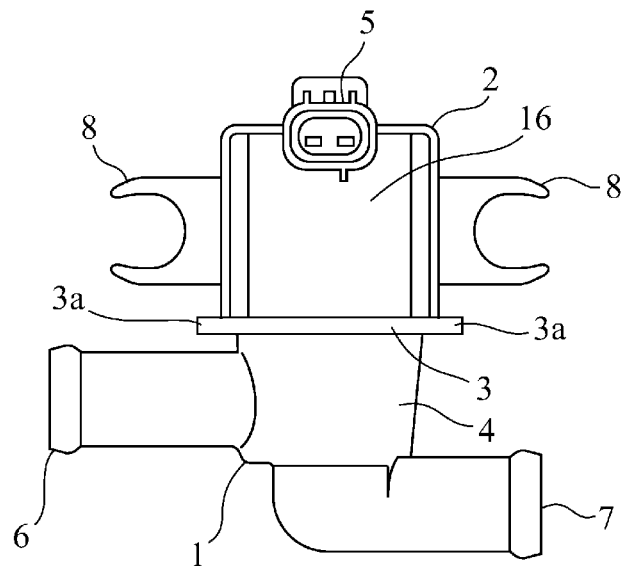
FIG. 2 is a front view showing an arrangement of the canister vent solenoid valve in accordance with the first embodiment of the present invention.
Figure 3:
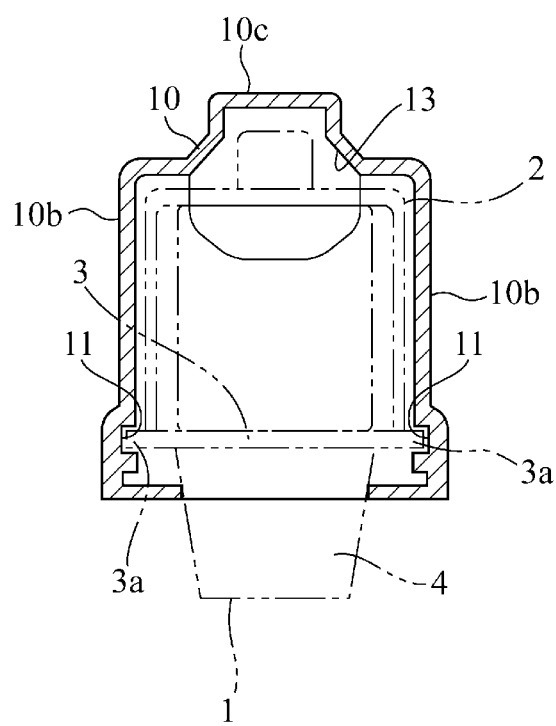
FIG. 3 is a sectional view showing an engaged structure of the canister vent solenoid valve and the protective cover in accordance with the first embodiment of the present invention.

FIG. 1 shows a state where a protective cover 10 is mounted to a canister vent solenoid valve 1 in accordance with a first embodiment of the present invention: FIG. 1(*a*) is a plan view, FIG. 1(*b*) is a front view, and FIG. 1(*c*) is a side view. FIG. 2 is a front view showing an appearance of the canister vent solenoid valve 1 in accordance with the first embodiment of the present invention before mounting a protective cover thereto. FIG. 3 shows a sectional view of the protective cover 10 sectioned along the line A-A of FIG. 1(*c*). In order to explain an engaged structure of the protective cover 10 and the canister vent solenoid valve 1, FIG. 3 illustrates an appearance of the canister vent solenoid valve 1 for reference.

The canister vent solenoid valve 1 shown in FIG. 2 has a U-shaped yoke 2 consisting of a plated sheet-metal component. The yoke 2 is mounted on a yoke mounting board 3 so as to cover a housing 16 for housing a coil, a stator for forming a magnetic circuit by excitation of the coil, and a mover (armature) moving by the excitation of the coil. The yoke mounting board 3 consists of a sheet-metal component like the yoke 2, and both the yoke 2 and the yoke mounting board 3 also serve as apart of components constituting the magnetic circuit. A valve section 4 is provided on the underside of the yoke mounting board 3, and an input port 6 communicating with a fresh-air intake section and an output port 7 communicating with the canister are provided in the valve section 4. The input port 6 and the output port 7 communicate with each other internally of the valve section 4, and a valve body is disposed so as to open and close the communicating passage therebetween.

Further, a power source connector 5 for supplying power to the coil is secured to the housing 16. On the opposite side of the housing from the face thereof to which the power source connector 5 is secured, a holding section 8 for mounting the canister vent solenoid valve 1 to a vehicle body is formed integral with the yoke 2.

Next, the protective cover 10 will be described. The protective cover 10 made of a molded plastic resin, as shown in FIG. 1, is mounted to the canister vent solenoid valve 1 so as to cover the yoke 2 of the solenoid valve. The protective cover 10 is composed of a top plate 10a, opposite side plates 10b, and a side plate 10c formed on the peripheral, three sides of the top plate 10a.

As shown in FIG. 3, guide grooves 11 are respectively formed in the positions where the inner walls of the opposite side plates 10b come in contact with the fringes 3a of the yoke mounting board 3 projecting outwardly from the yoke 2. Further, as shown in FIG. 1(c), mounting sections 12 projecting in the direction parallel to the guide groove 11 are formed on respective sides of the opposite side plates 10b that are opposite to the top plate 10a. The mounting section 12 includes a snap fit having resiliency, and has a claw section 12a shown in FIG. 1(a) provided at the tip mounting section 12.

Furthermore, a connector hole 13 for passing through the power source connector 5, and a plurality of drain holes 14 for draining water which may be intruded into the protective cover 10 are provided through the top plate 10a of the protective cover 10, respectively.

On mounting the protective cover 10 to the canister vent solenoid valve 1, the fringes 3a of the yoke mounting board 3 are engaged with the guide grooves 11 of the protective cover 10 while first outwardly pushing and opening each of the claw sections 12a of the mounting section 12. Then, the protective cover 10 is moved in the mounting direction B along the guide grooves 11. Finally, the claw sections 12a of the mounting section 12 are locked at the edges of the yoke 2.

The guide grooves 11 and the fringes 3a of the yoke mounting board 3 are engaged with each other, and the claw sections 12a of the mounting section 12 are locked at the edges of the yoke 2, thus restricting the movement of the protective cover 10 in three directions: vertical, lateral, and back and forth; thus, the protective cover 10 is held with attached to the yoke 2 of the canister vent solenoid valve 1.

The guide grooves 11 guide the protective cover 10 in the mounting direction B, thus facilitating the mounting of the cover, and also preventing the false mounting thereof.

Moreover, by employing the snap fit mounting sections 12, the need for using separate components such as screws for mounting the protective cover 10 to the canister vent solenoid valve 1 is eliminated, and the mounting work can be conveniently simplified.

The canister vent solenoid valve 1 mounted by the protective cover 10 is installed near a rear wheel of a vehicle body by fastening the holding section 8 to a vehicle body 15 with screws 9. After the installation to the vehicle body, a power cable is connected to the power source connector 5 projecting from the connector hole 13 of the protective cover 10.

The yoke 2 of the canister vent solenoid valve 1 having been installed to the vehicle body is protected by the protective cover 10, which enables to prevent direct collisions of stones or the like swirled by rear wheels. As a result, it becomes possible to prevent damage to the plating on the outer surface of the yoke 2, and the occurrence of corrosion due to the damage to the plating.

Further, even if a stone or the like collides against the protective cover 10, the shock given to the yoke 2 is cushioned in comparison with the one in a case where a stone directly collides against the yoke without the protective cover 10; thus, it becomes possible to suppress deterioration in performance of the canister vent solenoid valve 1 to be caused by the shock.

Moreover, even when the mounting section 12 is damaged and the protective cover 10 is detached from the yoke 2, the connector hole 13 is hooked on the power cable connected with the power source connector 5, thus preventing the protective cover 10 from dropping off from the vehicle body.

Furthermore, the protective cover 10 can be made of only a molded plastic resin in the manufacturing process, which can provide an advantage in the cost.

In this connection, upon detaching the protective cover 10 from the canister vent solenoid valve 1, the power cable is first pulled out from the power source connector 5, and it has only to move the protective cover 10 in the direction opposite from the mounting direction B while outwardly pushing and opening each of the claw sections 12a to release the lock of the claw sections with the yoke 2. Thus, the replacement upon a partial breakage thereof or the like can be easily carried out.

As discussed above, in accordance with the first embodiment, it is arranged that the protective cover 10 is mounted to the yoke 2 of the canister vent solenoid valve 1 installed near a rear wheel of a vehicle body. Therefore, direct collisions of stones or the like swirled by wheels against the outer surface of the yoke 2 can be prevented. As a result, damage to the plating of the yoke 2, and the occurrence of corrosion due to the damage to the plating can be prevented.

Besides, the guide grooves 11 to be engaged with the fringes 3a of the yoke mounting board 3 are provided in the inner walls of the opposite side plates 10b. In assembly, since the guide grooves 11 guide the fringes 3a of the yoke mounting board 3, the mounting work of the protective cover 10 can be facilitated, and also the false mounting of the protective cover can be prevented.

Furthermore, the protective cover 10 has provided on the opposite side plates 10b thereof, the mounting sections 12 formed protrusively in the direction parallel to the guide grooves 11, and further each of the mounting sections 12 has provided at the tip thereof, the claw section 12a for locking the edge of the yoke 2 located on the interior side of the yoke, when the protective cover 10 is attached to the canister vent solenoid valve from the front side of the yoke 2 along the guide grooves 11. Therefore, the need for using separate components such as screws for mounting is eliminated, and the mounting work can be conveniently simplified.

Further, the connector hole 13 for passing through the power source connector 5 of the canister vent solenoid valve 1 is provided in the top plate 10a of the protective cover 10. For this reason, even if the mounting section 12 is damaged to detach the protective cover 10 from the yoke 2, the connector hole 13 is hooked on the power cable connected with the power source connector 5, thus preventing the protective cover from falling out.

Second Embodiment

In the aforementioned first embodiment, the holding section 8 for installing the canister vent solenoid valve 1 to a vehicle body is provided on the canister vent solenoid valve 1 itself; however, in the second embodiment, a holding section 8 is provided on a protective cover 10.

Figure 4:
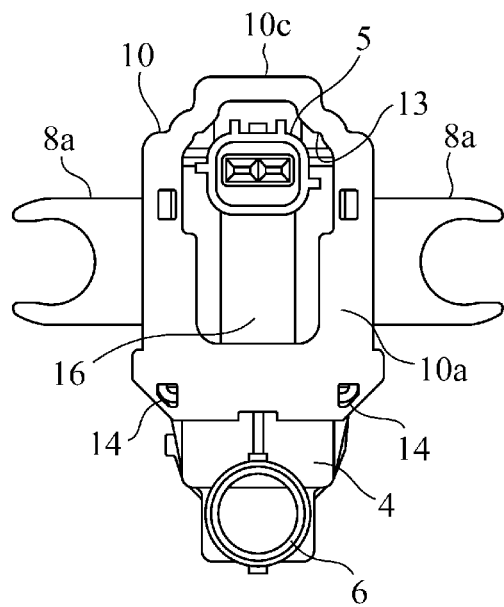
FIG. 4 is a front view showing a state where a protective cover is mounted to a canister vent solenoid valve in accordance with a second embodiment of the present invention.
Figure 5:
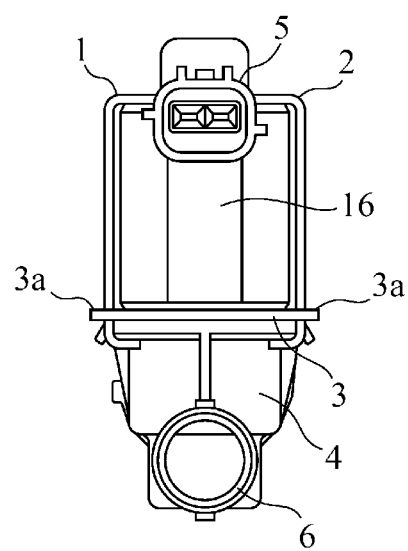
FIG. 5 is a front view showing an arrangement of the canister vent solenoid valve in accordance with the second embodiment of the present invention.

FIG. 4 is a front view showing a state where a protective cover 10 is mounted to a canister vent solenoid valve 1 in accordance with a second embodiment of the present invention. Further, FIG. 5 is a front view showing an appearance of the canister vent solenoid valve 1 in accordance with the second embodiment before mounting a protective cover thereto. In FIG. 4 and FIG. 5, the same or equivalent parts in FIG. 1 to FIG. 3 are designated by the same reference numerals, and these explanations will be omitted.

A protective-cover-side holding section 8a of the protective cover 10 is fastened to a vehicle body (objective) with screws. Therefore, the canister vent solenoid valve 1 mounted by the protective cover 10 is fixed near a rear wheel of a vehicle body by the coupling of an input port 6 and an output port 7 (not depicted) to a valve piping, and the mounting of the protective-cover-side holding section 8a to the vehicle body.

The protective-cover-side holding section 8a, which is a component to be mounted to a vehicle body, is arranged as a component separated from the canister vent solenoid valve 1. Thus, flexibility in the design of the protective-cover-side holding section 8a can be increased. The shape of the canister vent solenoid valve 1 itself that can be designed is often limited under the constraints in the mass production line and cost; however, when the protective cover 10 provided with the protective-cover-side holding section 8a having a different shape is mounted to the canister vent solenoid valve 1 having the same shape, it becomes possible to further increase variations of the mounting method to the vehicle body. In other words, the standardization of the canister vent solenoid valve 1 that is a basic component can achieve the cost reduction.

In addition, when the canister vent solenoid valve 1 that is a precision component is subject to a process such as fabrication of the holding section, there is a possibility that the canister vent solenoid valve is affected in an output characteristic thereof. However, since the protective-cover-side holding section 8a is arranged as a component that is separated from the canister vent solenoid valve 1, the canister vent solenoid valve 1 is not affected in its quality, particularly the output characteristics.

Figure 6:
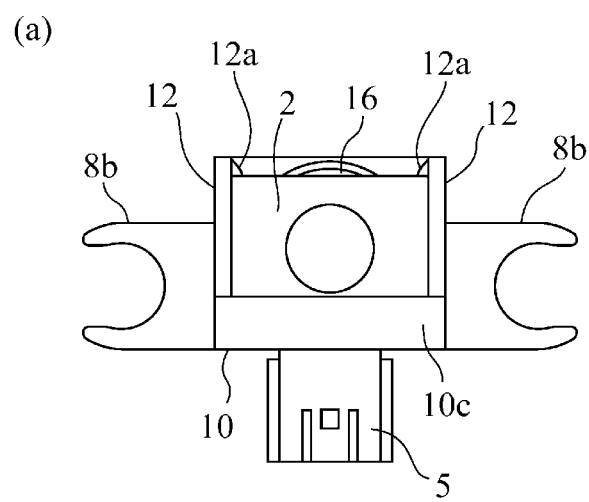
FIG. 6 shows a state where the protective cover is mounted to the canister vent solenoid valve in accordance with the second embodiment of the present invention.
Figure 6:
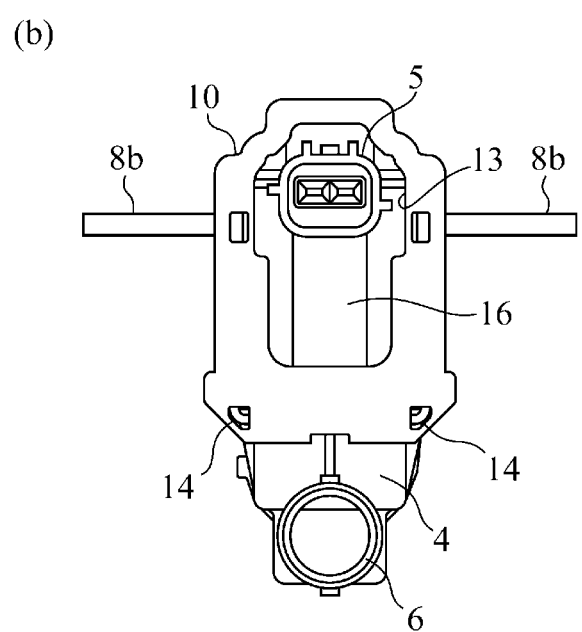

In this context, the shape of the protective-cover-side holding section 8a provided on the protective cover 10, not limited to the one as shown in FIG. 4, may be the one changing the screw-fastening direction as shown in FIG. 6, for instance. FIG. 6 shows one example of the protective cover 10 in accordance with the second embodiment: FIG. 6(a) is a plan view showing a state where the protective cover 10 is mounted to the canister vent solenoid valve 1, and FIG. 6(b) is a front view of the state. The shape of the canister vent solenoid valve 1 as shown in FIG. 6 is the same as that of the canister vent solenoid valve 1 as shown in FIG. 5. This protective-cover-side holding section 8b also has a similar effect to that of the protective-cover-side holding section 8a as discussed above.

Figure 7:
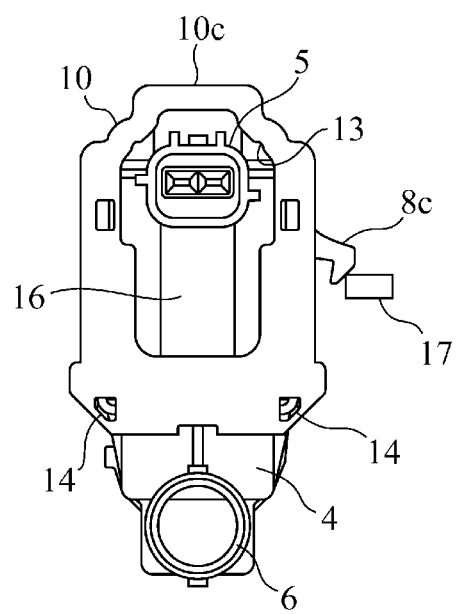
FIG. 7 is a front view showing a state where the protective cover is mounted to the canister vent solenoid valve in accordance with the second embodiment of the present invention.

Further, the protective-cover-side holding section 8a provided on the protective cover 10 may be formed with a snap fit having resiliency. FIG. 7 shows one example of the protective cover 10 in accordance with the second embodiment, and is a front view showing a state where the protective cover 10 is mounted to the canister vent solenoid valve 1. The shape of the canister vent solenoid valve 1 as shown in FIG. 7 is the same as the one of the canister vent solenoid valve 1 as shown in FIG. 5. It is to be noted that a vehicle-body-side mounting section (objective) 17 for locking a protective-cover-side holding section 8c is provided on the side of a vehicle body. Upon installing the protective cover 10 on the side of the vehicle body, the protective-cover-side holding section 8c may be locked with flexing the vehicle-body-side mounting section 17, or the section 17 may be locked with flexing the protective-cover-side holding section 8c. Even in the protective-cover-side holding section 8c, a similar effect to those of the protective-cover-side holding sections 8a, 8b as discussed above can be provided.

Moreover, the employment of the protective-cover-side holding section 8c of snap fit can eliminate the need for using separate components such as screws for mounting the canister vent solenoid valve to a vehicle body, which enables to conveniently simplify the mounting work.

As described above, in accordance with the second embodiment, it is arranged that the protective-cover-side holding section 8a, 8b, or 8c to be attached to a vehicle body are provided on the protective cover 10. Therefore, the protective-cover-side holding sections 8a, 8b, and 8c can be formed as a component separated from the canister vent solenoid valve 1, and flexibility in the design of the protective-cover-side holding sections 8a, 8b, and 8c can be enhanced. Further, the canister vent solenoid valve 1 that is a basic component is standardized, thus reducing the cost. Besides, the protective-cover-side holding sections 8a, 8b, and 8c are provided as a component separated from the canister vent solenoid valve 1, which has no effect on the quality of the canister vent solenoid valve 1.

INDUSTRIAL APPLICABILITY

As discussed above, since the protective cover according to the present invention is arranged to protect the surface of a yoke of a solenoid valve, it is suitable for use in canister vent solenoid valves or the like installed near a rear wheel of a vehicle body.

The invention claimed is:
1. A protective cover for a canister vent solenoid valve installed in a vehicle, comprising:
    a plurality of side plates for covering an outer surface of a yoke, the yoke covering a housing of the canister vent solenoid valve; and
    a guide groove provided in inner walls of the side plates to slide the protective cover along a fringe of a mounting board to which the yoke is mounted and in a direction perpendicular to a thickness direction of the mounting board, and
    wherein the guide groove is shaped to conform to the fringe without the side plates being stretched.
2. The protective cover according to claim 1, further comprising:
    a mounting section having resiliency, the mounting section protruding from the side plates in a direction parallel to the guide groove; and
    a claw section provided at a tip of the mounting section, the claw section latching onto an interior fringe of the yoke when the protective cover finishes sliding along the guide groove from the front side of the yoke.
3. The protective cover according to claim 1, further comprising a connector hole through which a power source connector of the canister vent solenoid valve is passed.
4. The protective cover according to claim 1, further comprising a holding section for attaching the protective cover to the vehicle, the holding section having resiliency and being provided with a claw.
5. The protective cover according to claim 1, wherein the protective cover is installed near a rear wheel of the vehicle.
6. A protective cover for a canister vent solenoid valve, the protective cover being made of a molded plastic resin, comprising:
    a plurality of side plates for covering a housing of the canister vent solenoid valve, and covering an outer surface of a yoke constituting a magnetic circuit; and
    a guide groove provided in inner walls of the side plates to slide the protective cover along a fringe of a mounting board to which the yoke is mounted and in a direction perpendicular to a thickness direction of the mounting board, and wherein the guide groove is shaped to conform to the fringe without the side plates being stretched.

7. A protective cover for a canister vent solenoid valve installed in a vehicle, comprising:
- a plurality of side plates for covering an outer surface of a yoke, the yoke covering a housing of the canister vent solenoid valve; and
- a guide groove provided in inner walls of the side plates to slide the protective cover along a fringe of a mounting board to which the yoke is mounted and in a direction perpendicular to a thickness direction of the mounting board;
- a mounting section having resiliency, the mounting section protruding from the side plates in a direction parallel to the guide groove; and
- a claw section provided at a tip of the mounting section, the claw section latching onto an interior fringe of the yoke when the protective cover finishes sliding along the guide groove from the front side of the yoke.

* * * * *